United States Patent
Kobayashi et al.

(10) Patent No.: US 12,339,190 B2
(45) Date of Patent: Jun. 24, 2025

(54) PRESSURE SENSOR

(71) Applicant: TDK CORPORATION, Tokyo (JP)

(72) Inventors: Masanori Kobayashi, Tokyo (JP); Ken Unno, Tokyo (JP); Tetsuya Sasahara, Tokyo (JP); Kohei Nawaoka, Tokyo (JP)

(73) Assignee: TDK CORPORATION, Tokyo (JP)

(*) Notice: Subject to any disclaimer, the term of this patent is extended or adjusted under 35 U.S.C. 154(b) by 361 days.

(21) Appl. No.: 17/790,988

(22) PCT Filed: Feb. 15, 2021

(86) PCT No.: PCT/JP2021/005556
§ 371 (c)(1),
(2) Date: Dec. 6, 2022

(87) PCT Pub. No.: WO2021/166853
PCT Pub. Date: Aug. 26, 2021

(65) Prior Publication Data
US 2023/0131075 A1    Apr. 27, 2023

(30) Foreign Application Priority Data
Feb. 21, 2020  (JP) ................ 2020-027866

(51) Int. Cl.
*G01L 9/00*    (2006.01)

(52) U.S. Cl.
CPC .......... *G01L 9/0001* (2013.01); *G01L 9/0042* (2013.01); *G01L 9/0051* (2013.01); *G01L 9/0055* (2013.01)

(58) Field of Classification Search
CPC ... G01L 9/0001; G01L 9/0041; G01L 9/0042; G01L 9/0051–0055
See application file for complete search history.

(56) References Cited

U.S. PATENT DOCUMENTS 10,067,010 B2 *  9/2018  Kodama ............... G01L 1/2287
10,260,981 B2 *  4/2019  Holm .................... G01L 9/0052
(Continued)

FOREIGN PATENT DOCUMENTS

CN       107490337 A    12/2017
JP       2002-022579 A   1/2002
(Continued)

OTHER PUBLICATIONS

Rausch et al., "Printed Resistive Strain Sensors for Monitoring of Light-Weight Structures," Proc. of SPIE, Mar. 24, 2011, vol. 7982, No. 1.

(Continued)

*Primary Examiner* — Justin N Olamit
(74) *Attorney, Agent, or Firm* — Oliff PLC (57) ABSTRACT

[Problem] To provide a pressure sensor that has a plurality of detection parts in a lamination direction, and moreover has improved detection accuracy. [Solution] A pressure sensor 10 has a membrane 22 in which deformation corresponding to pressure occurs, a first gauge layer 40 which is formed on the membrane 22, an intermediate insulation layer 50 which is formed on the first gauge layer 40, and a second gauge layer 60 which is formed on the intermediate insulation layer 50. The first gauge layer 40 and the second gauge layer 60 respectively include a first detection part 42 and a second detection part 62 which detect the deformation of the membrane. The distance from the surface of the membrane 22 to the second detection part 62 is no more than 30 μm.

9 Claims, 10 Drawing Sheets

(56) References Cited

U.S. PATENT DOCUMENTS

| | | | |
|---|---|---|---|
| 10,365,173 B2 * | 7/2019 | Li | ............................ G01L 9/06 |
| 11,092,504 B2 * | 8/2021 | Daup | ..................... G01L 9/0055 |
| 2017/0356814 A1 | 12/2017 | Kodama et al. | |
| 2020/0200617 A1 * | 6/2020 | Toyoshima | ............... G01L 5/00 |

FOREIGN PATENT DOCUMENTS

| | | | |
|---|---|---|---|
| JP | 2017-211321 A | | 11/2017 |
| JP | 2018040726 A | * | 3/2018 |
| WO | 03/006943 A1 | | 1/2003 |

OTHER PUBLICATIONS

Feb. 19, 2024 Extended Search Report issued in European Patent Application No. 21756421.0.

* cited by examiner

PRESSURE SENSOR

TECHNICAL FIELD

The present invention relates to a pressure sensor that detects pressure based on a deformation of a membrane.

BACKGROUND

A pressure sensor is known that detects a distortion of a membrane (also referred to as a diaphragm) by resistance change using a piezoresistive effect. In such a pressure sensor, the distortion due to the deformation of the membrane is detected by a resistance change of a resistor provided on the membrane.

To improve the reliability of such a pressure sensor, for example, Patent Document 1 below proposes that a plurality of pressure detection units be stacked and arranged.

In the conventional pressure sensor in which a plurality of detection units are stacked and arranged, however, the detection units are formed on the surfaces of rigid plates, the rigid plates are stacked to form a pressure sensor, the distances to the detection units are not taken into consideration, and there is a problem with detection accuracy.

PRIOR ARTS

Patent Document

Patent Document 1: JP2018040726 (A)

SUMMARY OF INVENTION

Problems to be Solved by Invention

The present invention has been achieved under such circumstances. It is an object of the invention to provide a pressure sensor including a plurality of detection units in a lamination direction and having an improved detection accuracy.

Means for Solving the Problem

As a result of diligent studies for a pressure sensor including a plurality of detection units in a lamination direction and having an improved detection accuracy, the present inventors have found that the detection accuracy is improved by reducing a distance from a surface of a membrane to the detection unit of a second gauge layer and have achieved the present invention.

That is, a pressure sensor according to the present invention comprises:

a membrane generating a deformation in response to pressure;

a first gauge layer formed on the membrane;

an intermediate insulating layer formed on the first gauge layer; and a second gauge layer formed on the intermediate insulating layer, wherein the first gauge layer and the second gauge layer include a first detection unit and a second detection unit detecting the deformation of the membrane, respectively, and a distance from a surface of the membrane to the second detection unit is within 30 µm.

According to experiments of the present inventors, it is found that if the distance from the surface of the membrane to the second detection unit is within 30 µm, the distance from the surface of the membrane to the first detection unit is also within 30 µm, and the stresses (strains) detected by the detection units are substantially the same. As a result, the outputs of the detection signals detected by both of the first and second detection units are substantially the same. Thus, for example, it becomes possible to easily detect the failure of either of the detection units, and the detection accuracy can be improved, by comparing and monitoring the first detection signal detected by the first detection unit and the second detection signal detected by the second detection unit.

Moreover, in the pressure sensor of the present invention, since the first gauge layer, the intermediate insulating layer, and the second gauge layer can be easily thinly formed by a thin film forming method, such as sputtering and vapor deposition, it becomes possible to reduce the size and cost of the pressure sensor.

Preferably, each of the first gauge layer, the intermediate insulating layer, and the second gauge layer has a thickness of 10 µm or less. In such a thickness relation, the distance from the surface of the membrane to the second detection unit is easily determined within 30 µm When the membrane is made of a conductor, such as a metal, preferably, a base insulating layer having a thickness of 10 µm or less is formed between the membrane and the first gauge layer. When the base insulating layer is formed, the insulating property between the first gauge layer and the membrane is ensured, and the detection accuracy at the first detection unit of the first gauge layer is improved.

An electrode layer covering and connecting a part of the first gauge layer and a part of the second gauge layer may be formed on the membrane, and the electrode layer preferably has a thickness of 10 µm or less. When the electrode layer configured in such a manner is formed, at least a part of the wiring individually taken out from the gauge layers can be shared, and the extraction wiring can be simplified.

A pattern arrangement of the first gauge layer and a pattern arrangement of the second gauge layer may be substantially the same when viewed from a normal direction of the membrane. In this configuration, the position of the first detection unit of the first gauge layer and the position of the second detection unit of the second gauge layer are substantially the same, the stress by the pressure applied to the membrane is detected at substantially the same position, and the accuracy of the detection signal is further improved.

Instead, a pattern arrangement of the first gauge layer and a pattern arrangement of the second gauge layer may be displaced in a rotational direction when viewed from a normal direction of the membrane. In such an arrangement, the positions of extraction electrode parts of detection signals from the detection units of the gauge layers are easily offset.

The pressure sensor according to the present invention further comprises a comparison means for comparing and monitoring a first detection signal detected by the first detection unit and a second detection signal detected by the second detection unit. When the first detection signal and the second detection signal are compared using the comparison means, it becomes possible to easily detect the failure of either of the detection units, and the detection accuracy can be improved.

Instead, the pressure sensor according to the present invention further comprises a switching means for switching and outputting a first detection signal detected by the first detection unit and a second detection signal detected by the second detection unit. In this configuration, for example, if the detection unit of one gauge layer fails, the durability and redundancy of the pressure sensor are improved by switching to the detection unit of the other gauge layer.

Another gauge layer may be laminated on the second gauge layer via another intermediate insulating layer. In this configuration, the durability and redundancy of the pressure sensor are further improved. Preferably, a distance from a surface of the membrane to a detection unit of another gauge layer is within 50 μm. When the distance to the detection unit is within a predetermined range, the stress (strain) detected by the detection unit is not greatly different from the stress (strain) detected by the first detection unit and the second detection unit and can be detected with relatively high accuracy.

DETAILED DESCRIPTION OF INVENTION

Hereinafter, the present invention is described based on embodiments shown in the figures.

First Embodiment

Figure 1:
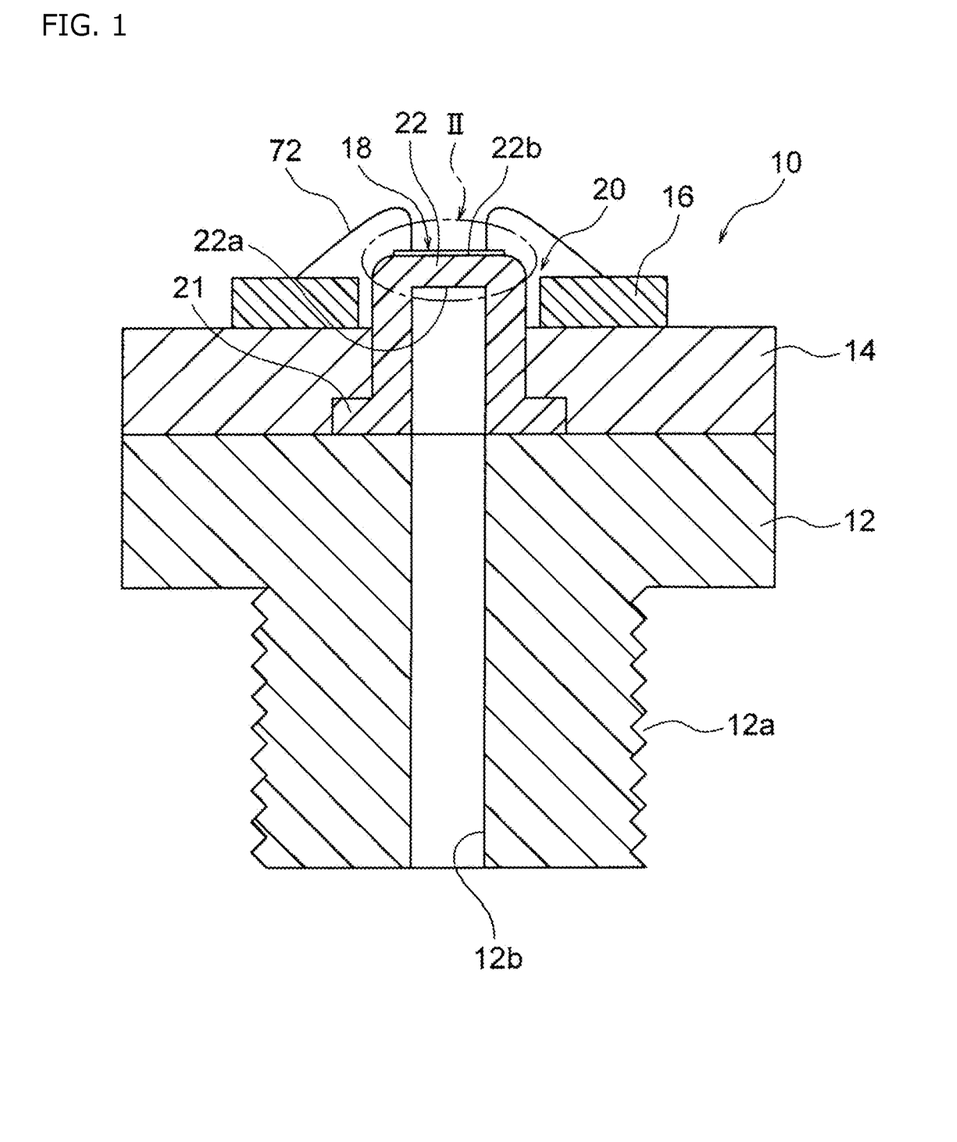
FIG. 1 is a schematic cross-sectional view of a pressure sensor according to an embodiment of the present invention.

As shown in FIG. 1, a pressure sensor 10 includes a membrane 22 that is deformed in response to pressure. In the present embodiment, the membrane 22 is made of an end wall formed at one end of a hollow cylindrical stem 20. The other end of the stem 20 is an open end of the hollow portion and communicates with a flow path 12b of a connection member 12, and the fluid introduced into the flow path 12b flows from the hollow portion of the stem 20 to an inner surface 22a of the membrane 22 and causes a fluid pressure acting on the membrane 22. For example, the stem 20 is made of a metal, such as stainless steel.

A flange portion 21 is formed around the open end of the stem 20 so as to project outward from the axis of the stem 20 and sandwiched between the connection member 12 and a holding member 14 so as to seal the flow path 12b leading to the inner surface of the membrane 22. The connection member 12 includes a screw groove 12a for fixing the pressure sensor 10 to, for example, a pressure chamber in which a fluid as a measurement target is sealed. The flow path 12b formed inside the connection member 12 tightly communicates with the inside of the pressure chamber in which the fluid as a measurement target is present by fixing the pressure sensor 10 to the pressure chamber or the like via the screw groove 12a.

A circuit board 16 is attached around the stem 20 on the upper surface of the holding member 14. The circuit board 16 includes, for example, comparators (comparison means) 80, 82, and 84 shown in FIG. 6, a changeover switch (changeover means) 90 shown in FIG. 7, a circuit for outputting a detection signal, and the like.

As shown in FIG. 1, a lamination-type sensor body 18 is formed on an outer surface 22b of the membrane 22. The lamination-type sensor body 18 and the circuit board 16 are connected by an intermediate wiring (e.g., wire bonding) 72.

Figure 2A:
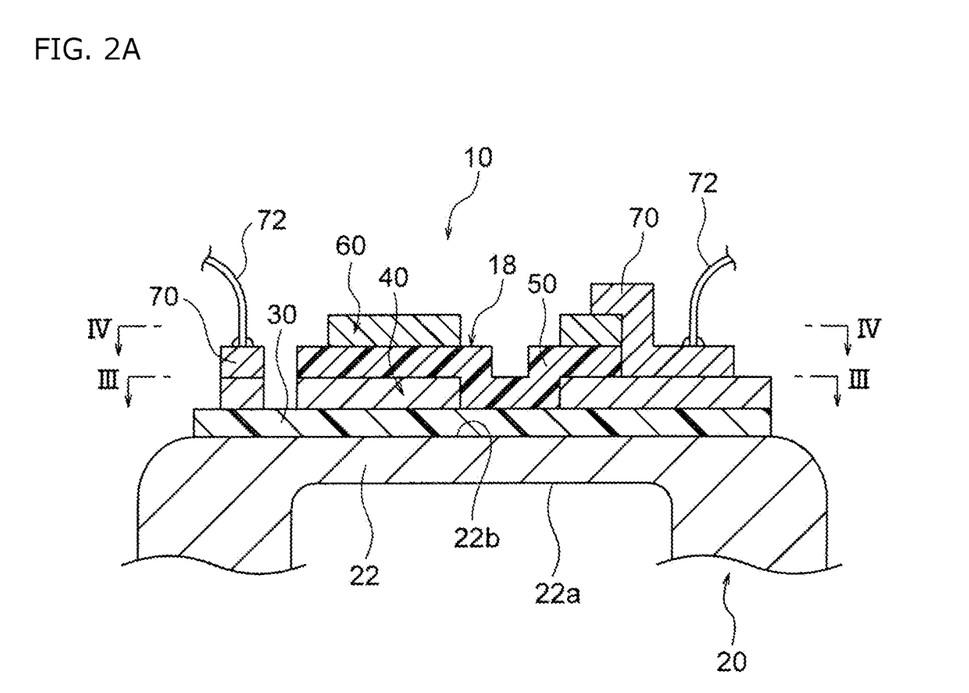
FIG. 2A is an enlarged cross-sectional view of the part shown by II in FIG. 1.

Next, the lamination-type sensor body 18 is described. As shown in FIG. 2A, the lamination-type sensor body 18 includes a base insulating layer 30 formed in close contact with the outer surface 22b of the membrane 22 and a first gauge layer 40 with a predetermined pattern formed on the base insulating layer 30.

The base insulating layer 30 is formed so as to cover almost the entire outer surface 22b of the membrane 22 and is composed of, for example, a silicon oxide, a silicon nitride, a silicon oxynitride, or the like. The thickness of the base insulating layer 30 is preferably 10 μm or less, more preferably 1-5 μm. The base insulating layer 30 can be formed on the outer surface 22b of the membrane 22 by, for example, a vapor deposition method such as CVD. When the outer surface 22b of the membrane 22 has an insulating property, the first gauge layer 40 may be formed directly on the outer surface 22b of the membrane 22 without forming the base insulating layer 30.

In the present embodiment, the lamination-type sensor body 18 further includes an intermediate insulating layer 50 with a predetermined pattern formed on the first gauge layer 40 and a second gauge layer 60 with a predetermined pattern formed on the intermediate insulating layer 50.

Figure 3:
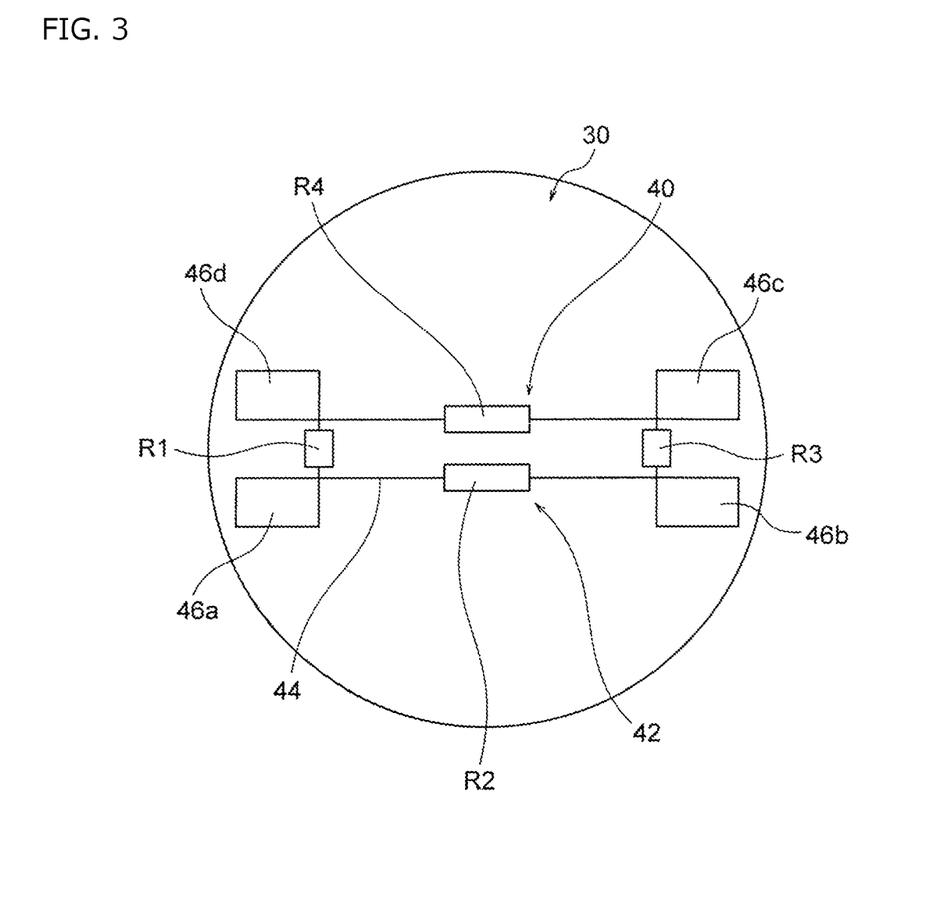
FIG. 3 is a schematic view illustrating a pattern arrangement of a first gauge layer along the line III-III shown in FIG. 2A.
Figure 6:
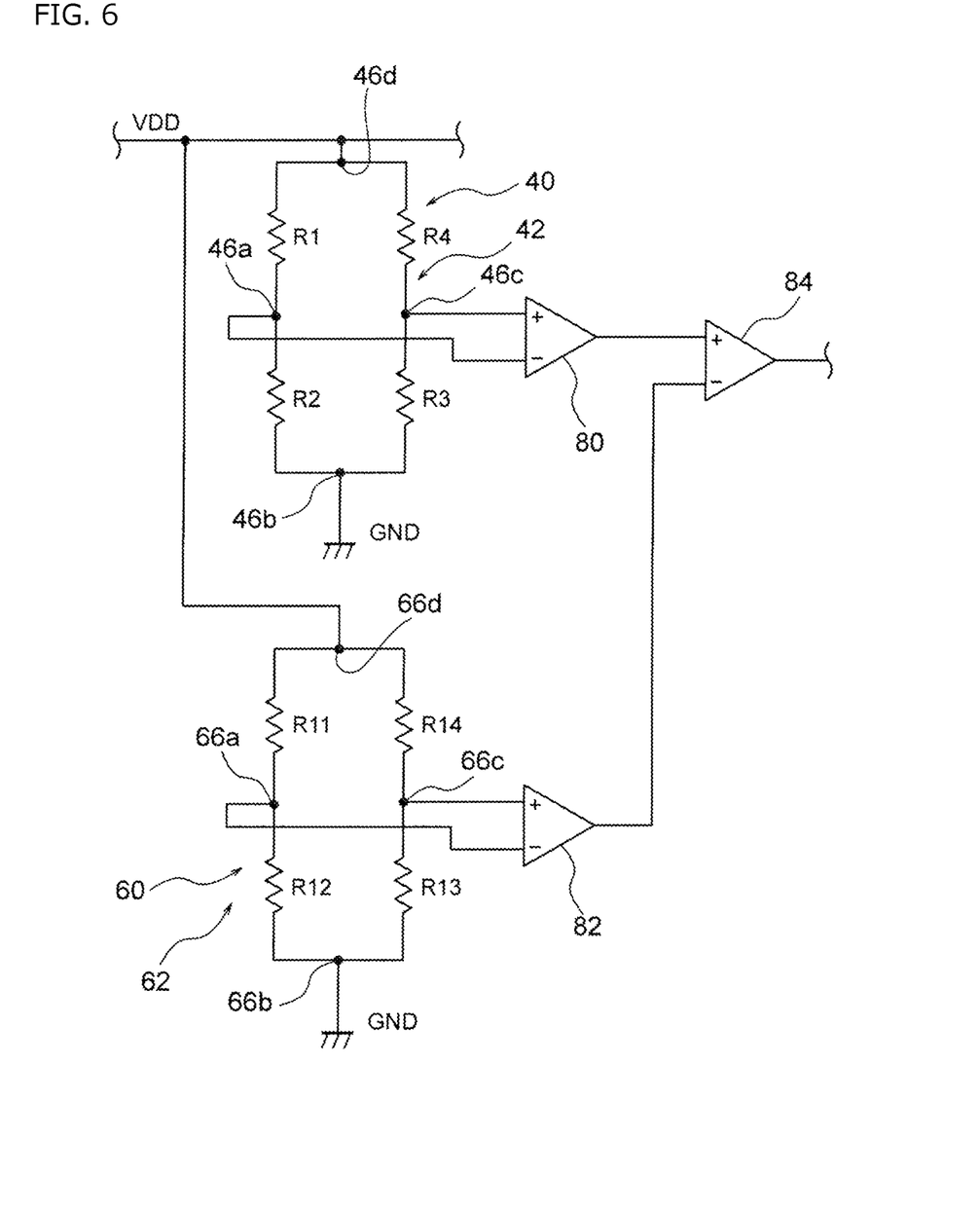
FIG. 6 is a circuit diagram illustrating a usage example of a pressure sensor according to an embodiment of the present invention.
Figure 7:
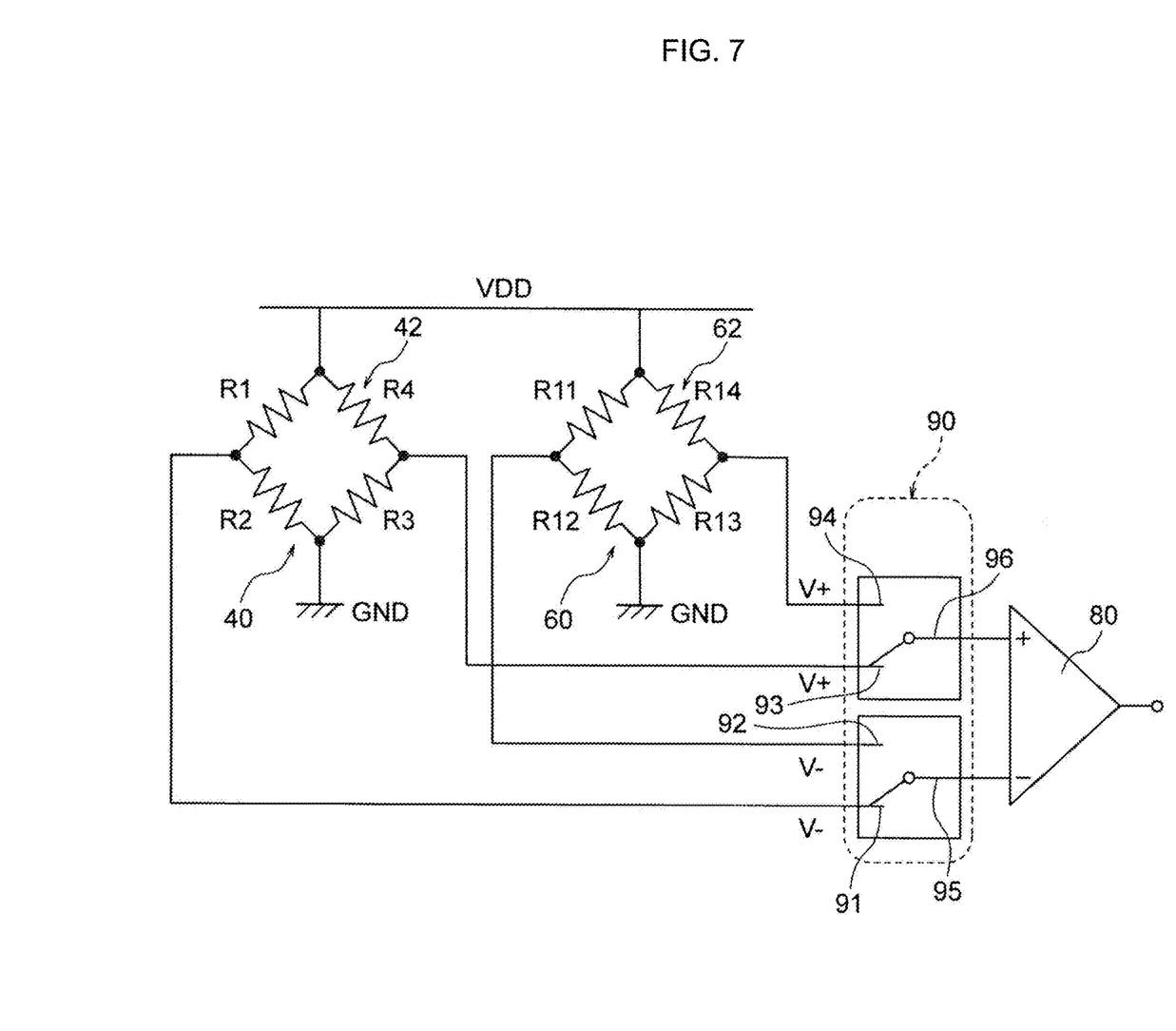
FIG. 7 is a circuit diagram illustrating a usage example of a pressure sensor according to another embodiment of the present invention.

As shown in FIG. 3, the first gauge layer 40 includes a first detection unit 42. The first detection unit 42 includes first to fourth resistors R1 to R4, and the first to fourth resistors R1 to R4 are connected so that a Wheatstone bridge circuit is formed by a first wiring layer 44. FIG. 6 or FIG. 7 illustrates a circuit diagram of the first detection unit 42 including the Wheatstone bridge circuit formed by the first to fourth resistors R1 to R4.

As shown in FIG. 3, first electrode layers 46a to 46d are formed between the first resistor R1 and the second resistor R2, between the second resistor R2 and the third resistor R3, between the third resistor R3 and the fourth resistor R4, and between the fourth resistor R4 and the first resistor R1, respectively, on the first wiring layer 44.

The first to fourth resistors R1 to R4, the wiring layer 44, and the first electrode layers 46a to 46d can all be formed by patterning conductive layers made of the same material and form the first gauge layer 40. The first gauge layer 40 can be made of, for example, a Ni—Cr alloy, chromium oxide, chromium nitride, or the like. The thickness of the first gauge layer 40 is preferably 10 μm or less, more preferably 0.1-1 μm. The first gauge layer 40 can be formed by a thin film method, such as sputtering.

The first to fourth resistors R1 to R4 are formed by, for example, patterning a conductor layer in a meander shape, the first wiring layer 44 is formed by patterning a conductor layer in a straight or curved line, and the electrode layers 46a to 46d are obtained by patterning a conductor layer so that the conductor layer is wider than the first wiring layer 44.

The first to fourth resistors R1 to R4 are attached at positions where the membrane 22 shown in FIG. 2A is deformed and distorted by the fluid pressure and are configured so that the resistance value changes according to the strain amount. The electrode layers 46a to 46d are not necessarily attached at positions where the membrane 22 is distorted.

As shown in FIG. 2A, the intermediate insulating layer 50 formed on the first gauge layer 40 is made of a material similar to that of the base insulating layer 30, but is not necessarily made of the same material. For example, since the silicon oxide tends to have a stress in the compression direction and the silicon nitride tends to have a tensile stress, when the base insulating layer 30 is made of a silicon oxide and the intermediate insulating layer 50 is made of a silicon nitride, this configuration cancels the stresses of the respective layers and is advantageous for reducing defects, such as peeling of the film. The intermediate insulating layer 50 can be formed in a manner similar to that of the base insulating layer 30.

Preferably, the intermediate insulating layer 50 is patterned. This is because it is necessary to expose a part of the surface of the first gauge layer 40. For example, the resistors R1 to R4 constituting the first detection unit 42 of the first gauge layer 40 shown in FIG. 3 are preferably all covered with the intermediate insulating layer 50 shown in FIG. 2A, but at least a part of the first electrode layers 46a to 46d shown in FIG. 3 is not preferably covered with the intermediate insulating layer 50. This is because the intermediate wiring layer 72 is connected to at least a part of the first electrode layers 46a to 46d shown in FIG. 3 via an extraction electrode layer 70 shown in FIG. 2A.

The thickness of the intermediate insulating layer 50 is preferably 10 μm or less, more preferably 1-5 μm. The thickness of the intermediate insulating layer 50 may be the same as the thickness of the base insulating layer 30, but may be different. For example, the thickness of the intermediate insulating layer 50 may be smaller than the thickness of the base insulating layer 30. When the intermediate insulating layer 50 and the base insulating layer 30 have different thicknesses, at least either of the insulating layers is insulated, and the redundancy is improved.

Figure 4A:
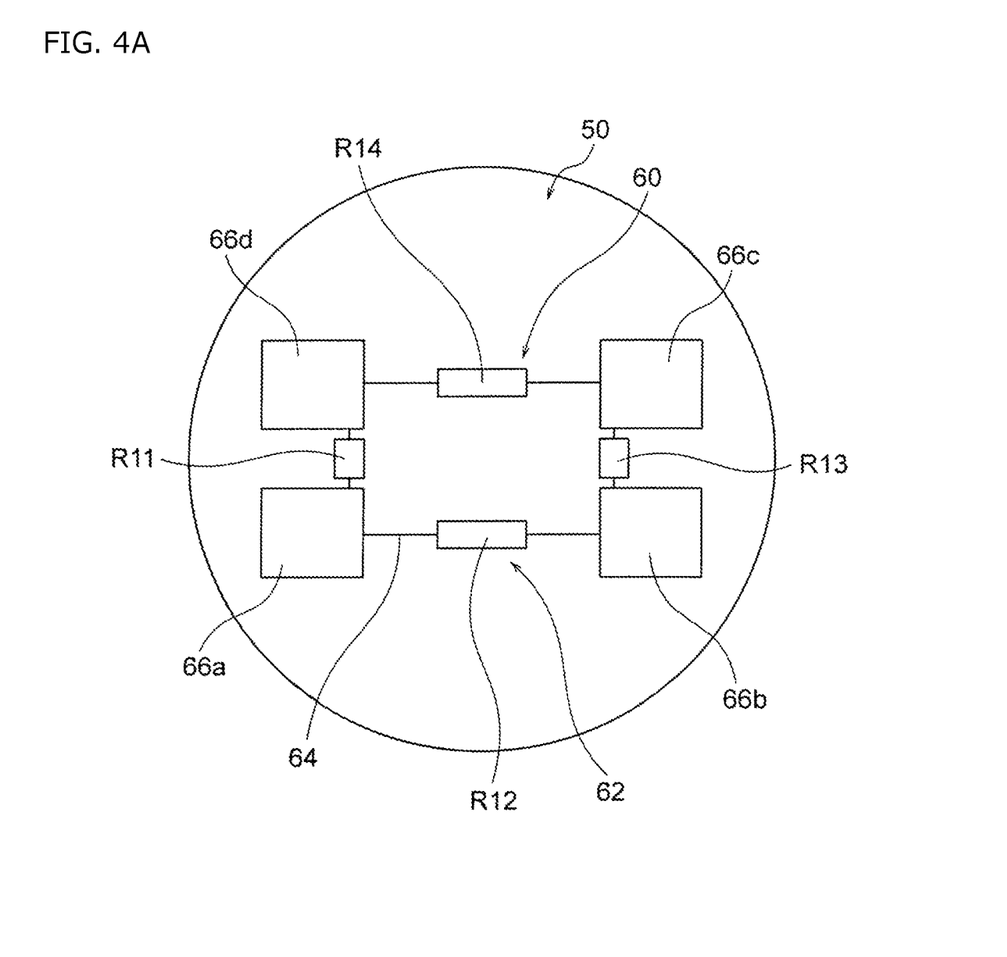
FIG. 4A is a schematic view illustrating a pattern arrangement of a second gauge layer along the IV-IV line shown in FIG. 2A.

The second gauge layer 60 is formed on the intermediate insulating layer 50. In the present embodiment, as shown in FIG. 4A, the second gauge layer 60 includes a second detection unit 62. As with the first detection unit 42, the second detection unit 62 includes first to fourth resistors R11 to R14, and the first to fourth resistors R11 to R14 are connected so that a Wheatstone bridge circuit is formed by the second wiring layer 64. FIG. 6 or FIG. 7 illustrates a circuit diagram of the second detection unit 62 including the Wheatstone bridge circuit formed by the first to fourth resistors R11 to R14.

As shown in FIG. 4A, second electrode layers 66a to 66d are formed between the first resistor R11 and the second resistor R12, between the second resistor R12 and the third resistor R13, between the third resistor R13 and the fourth resistor R14, and the fourth resistor R14 and the first resistor R11, respectively, on the second wiring layer 64.

The first to fourth resistors R11 to R14, the wiring layer 64, and the second electrode layers 66a to 66d can all be formed by patterning conductive layers made of the same material and form the second gauge layer 60. The second gauge layer 60 is made of, for example, a material similar to that of the first gauge layer 40, but is not necessarily made of the same material. When the second gauge layer 60 and the first gauge layer 40 are made of the same material, there is an advantage that it becomes easier to form detection units having substantially the same characteristics, and that the manufacturing becomes easier. When the second gauge layer 60 and the first gauge layer 40 are made of different materials, there is an advantage that the redundancy is improved.

The thickness of the second gauge layer 60 is preferably 10 μm or less, more preferably 0.1-1 μm. The thickness of the second gauge layer 60 is preferably the same as the thickness of the first gauge layer 40, but may be different. When the second gauge layer 60 and the first gauge layer 40 have the same thickness, there is an advantage that it becomes easier to form detection units having substantially the same characteristics. When the second gauge layer 60 and the first gauge layer 40 have different thicknesses, there is an advantage that the redundancy is improved.

The second gauge layer 60 can be formed by a thin film method similar to that of the first gauge layer 40, but the second gauge layer 60 and the first gauge layer 40 are not necessarily formed by the same manufacturing method. When the second gauge layer 60 and the first gauge layer 40 are formed by the same manufacturing method, there is an advantage that it becomes easier to form detection units having substantially the same characteristics, and that the manufacturing becomes easier. When the second gauge layer 60 and the first gauge layer 40 are formed by different manufacturing methods, there is an advantage that the redundancy is improved.

The first to fourth resistors R11 to R14 are formed, for example, by patterning a conductor layer in a meander shape, and the second wiring layer 64 is formed by patterning a conductor layer in a straight or curved line, and the second electrode layers 66a to 66d are obtained by patterning a conductor layer so that the conductor layer is wider than the second wiring layer 64.

The first to fourth resistors R11 to R14 are attached at positions where the membrane 22 shown in FIG. 2A is deformed and distorted by the fluid pressure and configured so that the resistance value changes according to the strain amount. The electrode layers 66a to 66d are not necessarily attached at positions where the membrane 22 is distorted.

In the present embodiment, as shown in FIG. 3 and FIG. 4A, the first resistor R1 of the first detection unit 40 and the first resistor R11 of the second detection unit 60 are arranged at approximately the same position when viewed from the normal direction (the direction perpendicular to the paper surfaces of FIG. 3 and FIG. 4A) of the membrane 22 shown in FIG. 2A. Moreover, the second resistor R2 of the first detection unit 40 and the second resistor R12 of the second detection unit 60 are arranged at approximately the same position when viewed from the normal direction of the membrane 22 shown in FIG. 2A.

Moreover, the third resistor R3 of the first detection unit 40 and the third resistor R13 of the second detection unit 60 are arranged at approximately the same position when viewed from the normal direction of the membrane 22 shown in FIG. 2A. Moreover, the fourth resistor R4 of the first detection unit 40 and the fourth resistance R14 of the second detection unit 60 are arranged at approximately the same position when viewed from the normal direction of the membrane 22 shown in FIG. 2A.

In the present embodiment, approximately the same position means substantially the same position and may not be exactly the same position and may be a position closer than the resistor located at an adjacent position connected by the wiring layer 44 or 64. For example, the resistors R4 and R14 are located closer than the resistors R1, R11, R3, and R13 at adjacent positions and can be said to be at substantially the same position.

In the present embodiment, as shown in FIG. 2A, an extraction electrode layer 70 covering and connecting a part of the first gauge layer 40 and a part of the second gauge layer 60 is formed on the membrane 22. The intermediate wiring 72 is connected to the extraction electrode layer 70.

The extraction electrode layer 70 is made of, for example, a metal (including an alloy) containing at least one of Au, Pt, W, Al, and Ni and may be formed by a thin film method such as sputtering, but does not need to be formed thinly compared to the gauge layers 40 and 60 and may thus be formed by a plating method or the like. Preferably, the extraction electrode layer 70 has a thickness of 0.1-4 μm.

An adhesion layer may be interposed between the first electrode layers 46a to 46d and the extraction electrode layer 70. Examples of the adhesion layer include a metal layer containing at least one of Ti, Cr, Ni, and Mo. The adhesion layer may be sufficiently thinner than the electrode layer 70. The wiring layer 72 may be directly connected to the first electrode layers 46a to 46d shown in FIG. 3 without using the extraction electrode layer 70.

In the present embodiment, as shown in FIG. 6, the resistors R1 to R4 of the first detection unit 42 are connected so as to form a Wheatstone bridge circuit, and the resistors R11 to R14 of the second detection unit 62 are similarly connected so as to form a Wheatstone bridge circuit. A power line VDD is connected between the resistor R1 and the resistor R2 of the first detection unit 42, and the power line VDD is also connected between the resistor R11 and the resistor R12 of the second detection unit 62.

A ground GND is connected between the resistor R2 and the resistor R3 of the first detection unit 42, and the ground GND is also connected between the resistor R12 and the resistor R13 of the second detection unit 62. One input end of the first comparator 80 as a comparison means is connected between the resistor R1 and the resistor R2 of the first detection unit 42, and the other input end of the first comparator 80 is connected between the resistor R3 and the resistor R4 of the first detection unit 42.

Likewise, one input end of the second comparator 82 as a comparison means is connected between the resistor R11 and the resistor R12 of the second detection unit 62, and the other input end of the second comparator 82 is connected between the resistor R13 and the resistor R14 of the second detection unit 62. The output end of the first comparator 80 and the output end of the second comparator 82 are connected to two respective input ends of the third comparator 84 as a comparison means. The output end of the third comparator 84 is connected to a control device or the like as a pressure detecting means (not illustrated).

As shown in FIG. 3, the electrode layer 46b is connected between the resistor R2 and the resistor R3 of the first detection unit 42 via the wiring layer 44. As shown in FIG. 4A, the electrode layer 66b is connected between the resistor R12 and the resistor R13 of the second detection unit 62 via the wiring layer 64. As shown in FIG. 6, the ground GND is connected between the resistor R2 and the resistor R3 of the first detection unit 42 and is also connected between the resistor R12 and the resistor R13 of the second detection unit 62. Thus, for example, the electrode layer 46b of the first gauge layer 40 and the electrode layer 66b of the second gauge layer 60 may be directly connected by the extraction electrode layer 70 shown in FIG. 2A and connected to the ground GND of the circuit board 16 shown in FIG. 1 by the single intermediate wiring 72.

Likewise, as shown in FIG. 3, the electrode layer 46d is connected between the resistor R1 and the resistor R4 of the first detection unit 42 via the wiring layer 44. As shown in FIG. 4A, the electrode layer 66d is connected between the resistor R11 and the resistor R14 of the second detection unit 62 via the wiring layer 64. As shown in FIG. 6, the power line VDD is connected between the resistor R1 and the resistor R4 of the first detection unit 42 and is also connected between the resistor R11 and the resistor R14 of the second detection unit 62. Thus, for example, the electrode layer 46d of the first gauge layer 40 and the electrode layer 66d of the second gauge layer 60 may be directly connected by the extraction electrode layer 70 shown in FIG. 2A and connected to the power line VDD of the circuit board 16 shown in FIG. 1 by the single intermediate wiring 72.

The other electrode layers 46a, 46c, 66a, and 66c shown in FIG. 3 and FIG. 4A are connected to the mutually different intermediate wirings 72 shown in FIG. 1 and connected to the input ends of the comparators 80 and 82 shown in FIG. 6 provided on the circuit board 16.

Next, a method of manufacturing the pressure sensor 10 shown in FIG. 1 is described. First, the stem 20 is prepared. The stem 20 is made of stainless steel, such as SUS316. Next, as shown in FIG. 2A, the lamination-type sensor body 18 is formed on the outer surface 22b of the membrane 22 of the stem 20.

To form the lamination-type sensor body 18, first, the base insulating layer 30 is formed on the outer surface 22b of the membrane 22 with a predetermined thickness by a thin film method, such as CVD and sputtering, so as to cover the membrane 22. Examples of the base insulating layer 30 include a silicon oxide film and a silicon nitride film.

Next, the first gauge layer 40 is formed on the surface of the base insulating layer 30 in a predetermined pattern. The first gauge layer 40 includes the resistors R1 to R4 shown in FIG. 3 as a pressure detection unit (first detection unit 42), the first wiring layer 44, and the first electrode layers 46a to 46d. In the present embodiment, the resistors R1 to R4, the first wiring layer 44, and the first electrode layers 46a to 46d are made of a Ni—Cr alloy film or the like and may be a single film or a multilayer film, but this total thickness is 10 μm or less.

The first gauge layer 40 is formed by a thin film method such as vapor deposition and sputtering. The first gauge layer 40 is patterned so as to be the resistors R1 to R4, the first wiring layer 44, and the first electrode layers 46a to 46d. Photolithography is used for the patterning. Specifically, methods such as lift-off, milling, and etching are used.

Next, the intermediate insulating layer 50 is formed on the patterned first gauge layer 40. The intermediate insulating layer 50 is formed with a predetermined thickness by a thin film method such as CVD and sputtering. As the intermediate insulating layer 50, a similar material to the material constituting the base insulating layer 30 may be used, but these materials do not always need to be the same.

Next, the second gauge layer 60 is formed on the intermediate insulating layer 50 in a predetermined pattern. The second gauge layer 60 includes the resistors R11 to R14 shown in FIG. 4A as a pressure detection unit (second detection unit 62), the second wiring layer 64, and the second electrode layers 66a to 66d. The material and forming method of the second gauge layer 60 are similar to the material and forming method of the first gauge layer 40, but the same material and forming method are not necessarily adopted.

Before or after the second gauge layer 60 is formed in a predetermined pattern on the intermediate insulating layer 50, the intermediate insulating layer 50 is patterned, for example, so as to expose at least a part of the electrode layers 46a to 46d formed on the first gauge layer 40. The method for the patterning is similar to that of the base insulating layer 30, but is not necessarily the same.

As shown in FIG. 2A, the extraction electrode layer 70 is formed on the second gauge layer 60 with a predetermined pattern in a state where a part of the first gauge layer 40 is exposed, and the extraction electrode layer 70 may connect a part of the first gauge layer 40 and a part of the second gauge layer 60 or may be formed only on a part of the first gauge layer 40.

The extraction electrode layer 70 may be formed by a thin film method, such as sputtering, but does not need to be formed thinly compared to the gauge layers 40 and 60 and may thus be formed by a plating method or the like.

Except for the intermediate wiring 72, the surface of the lamination-type sensor body 18 formed in such a manner may be covered with a protective layer. The protective layer may be, for example, an insulating layer formed by a thin film method or may be a resin film or the like.

In the pressure sensor 10 according to the present embodiment, as shown in FIG. 2A, each of the base insulating layer 30, the first gauge layer 40, and the intermediate insulating layer 50 has a thickness of 10 μm or less. Thus, the distance from the outer surface 22b of the membrane 22 to the second detection unit 62 of the second gauge layer 60 (normal direction of the membrane 22) can be 30 μm or less. The distance from the outer surface 22b of the membrane 22 to the first detection unit 42 of the first gauge layer 42 is also within 10 μm, which is 30 μm or less.

Figure 5:
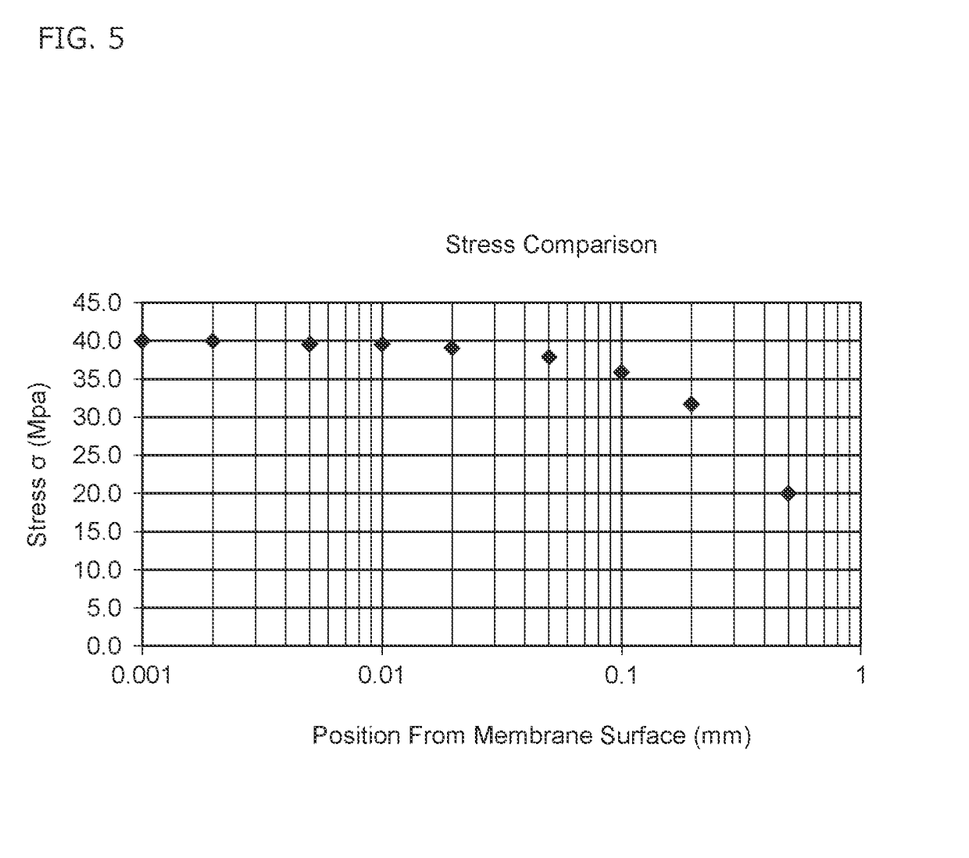
FIG. 5 is a graph illustrating a relation between a distance (position) from a membrane surface and a stress according to experiments by the present inventors.

According to FIG. 5, which shows experiments by the present inventors, when the distance in the normal direction from the surface (outer surface 22b) of the membrane 22 toward the outside is 30 μm (0.03 mm) or less, the stress acting on the laminated film formed on the surface of the membrane 22 is almost unchanged. That is, the stress (strain) detected by the first detection unit 42 of the first gauge layer 40 shown in FIG. 3 and the stress (strain) detected by the second detection unit 62 of the second gauge layer 60 shown in FIG. 4A substantially correspond with each other.

As a result, the outputs of the detection signals detected by the first detection unit 42 and the second detection unit 62 are substantially the same. Thus, for example, the comparator 84 as a comparison means shown in FIG. 6 can compare and monitor a first detection signal detected by the first detection unit 42 and a second detection signal detected by the second detection unit 62. For example, when the difference between the input signals detected by the comparator 84 is a predetermined value or more, it becomes possible to easily detect the failure of either of the detection units 42 and 62, and the detection accuracy can be improved.

Moreover, in the pressure sensor 10 of the present embodiment, since the first gauge layer 40, the intermediate insulating layer 50, and the second gauge layer 60 can be easily thinly formed by a thin film forming method, such as sputtering and vapor deposition, it becomes easy to reduce the size and cost of the pressure sensor 10.

Moreover, in the present embodiment, the base insulating layer 30 having a thickness of 10 μm or less is formed between the membrane 22 made of a conductive material, such as metal, and the first gauge layer 40. Since the base insulating layer 30 is formed, the insulating property between the first gauge layer 40 and the membrane 22 is ensured, and the detection accuracy at the first detection unit 42 of the first gauge layer 40 is improved.

Moreover, in the present embodiment, as shown in FIG. 2A, since the extraction electrode layer 70 preferably having a thickness of 10 μm or less is formed, at least a part of the wiring individually taken out from the gauge layers 40 and 60 can be shared, and the extraction wiring 72 can be simplified.

Moreover, in the present embodiment, the pattern arrangement of the first detection unit 42 of the first gauge layer 40 shown in FIG. 3 and the pattern arrangement of the second detection unit 62 of the second gauge layer 60 shown in FIG. 4A are substantially the same when viewed from the normal direction of the membrane 22. In this configuration, the stress by the pressure applied to the membrane 22 is detected by the resistors R1 to R4 or R11 to R14 at substantially the same position, and the accuracy of the detection signal is further improved.

In the above-described embodiment, the pattern arrangement of the first detection unit 42 of the first gauge layer 40 shown in FIG. 3 (arrangement of the resistors R1 to R4) and the pattern arrangement of the second detection unit 62 of the second gauge layer 60 shown in FIG. 4A (arrangement of the resistors R11 to R14) are slightly displaced when viewed from the normal direction of the membrane 22.

In the present embodiment, however, the pattern arrangement of the first detection unit 42 of the first gauge layer 40 shown in FIG. 3 and the arrangement of the second detection unit 62 of the second gauge layer 60 may substantially completely correspond with each other. That is, the second detection unit of the second gauge layer may be formed in the same arrangement as the pattern arrangement of the first detection unit 42 of the first gauge layer 40 shown in FIG. 3. In that case, however, it is preferable that the arrangement pattern of the first electrode layers 46a to 46d and the arrangement pattern of the second electrode layers 66a to 66d are displaced from each other. This is to enable the extraction electrode 70 or the intermediate wiring 72 to be connected to each of the electrode layers 46a to 46d and 66a to 66d.

Second Embodiment

Figure 2B:
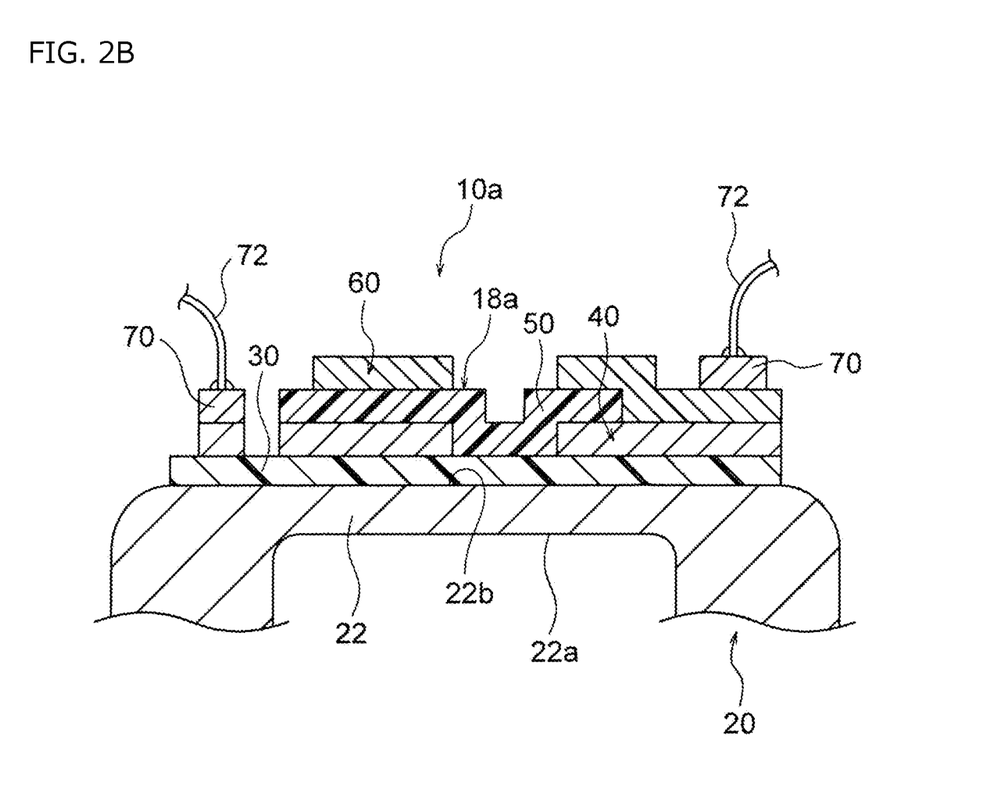
FIG. 2B is an enlarged cross-sectional view of a part corresponding to FIG. 2A according to another embodiment of the present invention.

In a pressure sensor 10a of the present embodiment, as shown in FIG. 2B, configurations and effects of a lamination-type sensor body 18a are only different from those in First Embodiment, and the other configurations and effects are similar to those in First Embodiment. The common matters are not described.

In the present embodiment, as shown in FIG. 2B, the pattern of the second gauge layer 60 is different from that in First Embodiment, and a part of the second gauge layer 60 is directly connected to a part of the first gauge layer 40. For example, the portion where a part of the second gauge layer 60 is directly connected to a part of the first gauge layer 40 is a portion where the electrode layer 46b of the first gauge layer 40 shown in FIG. 6 and the electrode layer 66b of the second gauge layer 60 are connected to the ground GND. For example, the portion where a part of the second gauge layer 60 is directly connected to a part of the first gauge layer 40 is a portion where the electrode layer 46d of the first gauge layer 40 shown in FIG. 6 and the electrode layer 66d of the second gauge layer 60 are connected to the power line VDD.

In the present embodiment, it is not necessary to directly connect the extraction electrode layer 70 or the intermediate wiring 72 to the electrode layer 46b and the electrode layer 46d of the first gauge layer 40, and the extraction electrode layer 70 or the intermediate wiring 72 is connected to the electrode layer 66b and the electrode layer 66d of the second gauge layer 60.

The other electrode layers 46a, 46c, 66a, and 66c shown in FIG. 3 and FIG. 4A are connected to the mutually different intermediate wirings 72 shown in FIG. 1 and are connected to the input ends of the comparators 80 and 82 shown in FIG. 6 provided on the circuit board 16.

Third Embodiment

Figure 2C:
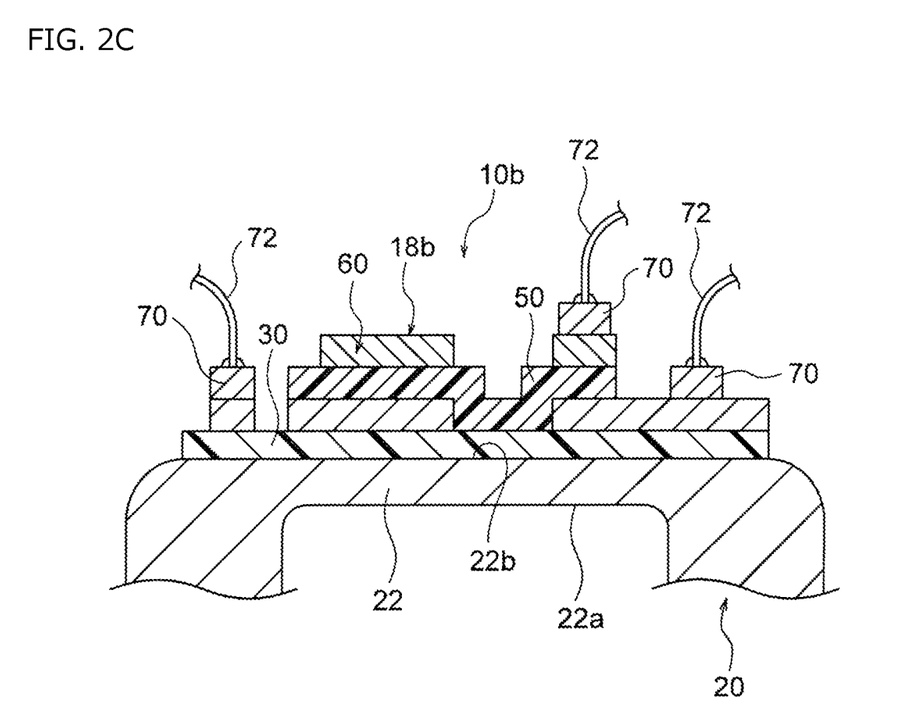
FIG. 2C is an enlarged cross-sectional view of a part corresponding to FIG. 2A according to still another embodiment of the present invention.

In a pressure sensor 10b of the present embodiment, as shown in FIG. 2C, configurations and effects of a lamination-type sensor body 18b are only different from those in First Embodiment, and the other configurations and effects are similar to those in First Embodiment. The common matters are not described.

In the present embodiment, as shown in FIG. 2C, the pattern of the intermediate insulating layer 50 or the pattern of the extraction electrode layer 70 is different so that the first gauge layer 40 and the second gauge layer 60 are insulated from each other. That is, in the present embodiment, inside the lamination-type sensor body 18b, the first gauge layer 40 and the second gauge layer 60 are not directly connected and are not indirectly connected either via the extraction electrode layer 70. Thus, the intermediate wiring 72 is connected to each of the electrode layers 46a to 46d and 66a to 66d shown in FIG. 3 and FIG. 4A via or without the extraction electrode layer 70 shown in FIG. 2C.

Fourth Embodiment

Figure 4B:
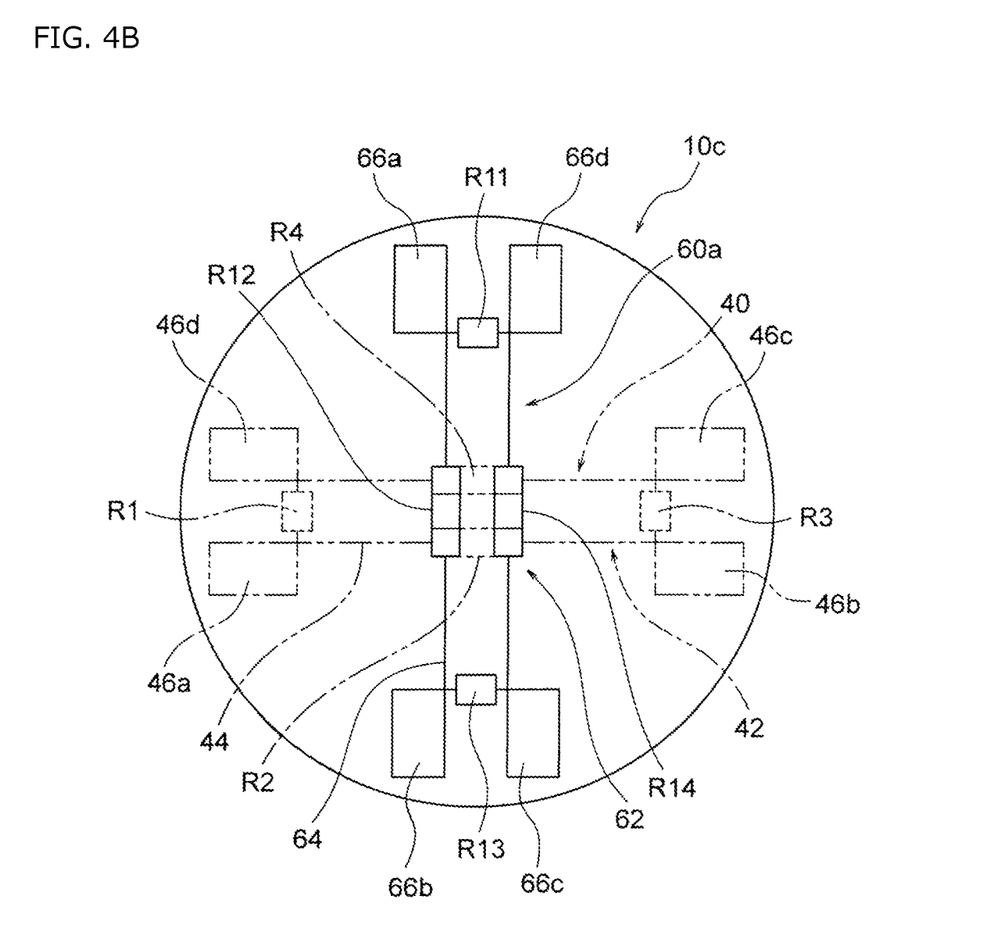
FIG. 4B is a schematic view illustrating a pattern arrangement of a second gauge layer according to another embodiment of the present invention.

In a pressure sensor 10c of the present embodiment, as shown in FIG. 4B, the pattern arrangement of the second gauge layer 60a is only different from that in First Embodiment, and the other configurations and effects are similar to those in First to Third Embodiments. The common matters are not described.

In the present embodiment, as shown in FIG. 4B, the pattern arrangement of the first detection unit 42 of the first gauge layer 40 and the pattern arrangement of the second detection unit 62 of the second gauge layer 60a are displaced in the rotational direction when viewed from the normal direction of the membrane 22 (see FIG. 1). In the present embodiment, the pattern arrangement of the second gauge layer 60a is the same as that of the first gauge layer 40, except that the rotation angle is displaced at a predetermined angle (about 90 degrees).

That is, in FIG. 4B, when the second gauge layer 60a is rotated counterclockwise at a predetermined angle (about 90 degrees), the electrode layers 46a to 46d of the first gauge layer 40 overlap with the electrode layers 66a to 66d of the second gauge layer 60, and the resistors R1 to R4 of the first gauge layer 40 overlap with the resistors R11 to R14 of the second gauge layer 60. Moreover, the wiring layer 44 and the wiring layer 64 also overlap with each other. In the example shown in FIG. 4B, the pattern arrangement of the second gauge layer 60a is displaced from the pattern arrangement of the first detection unit 42 of the first gauge layer 40 at a rotation angle of about 90 degrees, but the rotation angle is not limited to about 90 degrees. The rotation angle of the displacement can be freely changed, for example, in the range of 0 to 180 degrees, but is preferably about 60 to 120 degrees in the case of a large displacement.

In the present embodiment, the positions of the electrode layers 46a to 46d for extracting the detection signal from the detection unit 42 of the first gauge layer 40 and the positions of the electrode layers 66a to 66d for extracting the detection signal from the detection unit 62 of the second gauge layer 60a can be offset in the rotational direction. Thus, the wiring from each of the electrode layers 46a to 46d and 66a to 66d is easy.

Fifth Embodiment

As shown in FIG. 7, the pressure sensor of the present embodiment is similar to that of First to Fourth embodiments except that the pressure sensor of the present embodiment does not include the comparators 82 and 84 shown in FIG. 6, but includes a changeover switch (switching means) 90. The common matters are not described.

In the present embodiment, as shown in FIG. 7, a first input end 91 of the changeover switch 90 is connected between the resistor R1 and the resistor R2 of the first detection unit 42, and a third input end 93 of the changeover switch 90 is connected between the resistor R3 and the resistor R4 of the first detection unit 42. Likewise, a second input end 92 of the changeover switch 90 is connected between the resistor R11 and the resistor R12 of the second detection unit 62, and a fourth input end 94 of the changeover switch 90 is connected between the resistor R13 and the resistor R14 of the second detection unit 62.

In the changeover switch 90, a first output end 95 is connected to one input end of the comparator 80, and a second output end 96 is connected to the other input end of the comparator 80. The changeover switch 90 can simultaneously achieve the connection between the first input end 91 and the first output end 95 and the connection between the third input end 93 and the second output end 96. The changeover switch 90 is controlled by, for example, a control circuit built in the circuit board 16 shown in FIG. 1 and can switch the state shown in FIG. 7 to the state where the connection between the second input terminal 92 and the first output end 95 and the connection between the fourth input terminal 94 and the second output end 96 are achieved at the same time. Moreover, the changeover switch 90 is controlled by a control circuit built in the circuit board 16 shown in FIG. 1 and can switch the states in the reverse manner.

In the present embodiment, the first detection signal detected by the first detection unit 42 and the second detection signal detected by the second detection unit 62 can be switched by the changeover switch 90 and input to the comparator 80. In this configuration, for example, if the detection unit 42 or 62 of one gauge layer 40 or 60 fails, the durability and redundancy of the pressure sensor are improved by switching to the detection unit of the other gauge layer.

The present invention is not limited to the above-described embodiments and can be variously modified within the scope of the present invention.

For example, another gauge layer may be laminated on the second gauge layer 60 or 60a via another intermediate insulating layer 50. In such a configuration, the durability and redundancy of the pressure sensor are further improved. In that case, preferably, the distance from the outer surface 22b of the membrane 22 to the detection unit of another gauge layer is within 50 μm.

As shown in FIG. 5, when the distance (position) from the membrane surface is 50 μm (0.05) or less, the stress (strain) detected by the detection unit is not greatly different (within 1%) from the stress (strain) detected by the first detection unit 42 and the second detection unit 62 and can be detected with relatively high accuracy.

EXPLANATION OF REFERENCES 10, 10a, 10b . . . pressure sensor
12 . . . connection member
12a . . . screw groove
12b . . . flow path
14 . . . holding member
16 . . . circuit board
18, 18a, 18b . . . lamination-type sensor body
20 . . . stem
21 . . . flange portion
22 . . . membrane
22a . . . inner surface
22b . . . outer surface
30 . . . base insulating layer
40 . . . first gauge layer
42 . . . first detection unit
44 . . . first wiring layer
46a-46d . . . first electrode layer
50 . . . intermediate insulating layer
60, 60a . . . second gauge layer
62 . . . second detection unit
64 . . . second wiring layer
66a-66d . . . second electrode layer
70 . . . extraction electrode layer
72 . . . intermediate wiring
80, 82, 84 . . . comparator (comparison means)
90 . . . changeover switch (switching means)
R1, R11 . . . first resistor
R2, R12 . . . second resistor
R3, R13 . . . third resistor
R4, R14 . . . fourth resistor

The invention claimed is:

1. A pressure sensor comprising:
a membrane generating a deformation in response to pressure;
a first gauge layer formed on the membrane;
an intermediate insulating layer formed on the first gauge layer;
a second gauge layer formed on the intermediate insulating layer; and
an electrode layer that is in contact with an upper surface of the first gauge layer exposed from both the intermediate insulating layer and the second gauge layer, and in contact with an upper surface of the second gauge layer, and that connects the first gauge layer and the second gauge layer,
wherein the first gauge layer and the second gauge layer include a first l sensor and a second sensor detecting the deformation of the membrane, respectively, and
a distance from a surface of the membrane to the second sensor is within 30 μm.

2. The pressure sensor according to claim 1, wherein each of the first gauge layer, the intermediate insulating layer, and the second gauge layer has a thickness of 10 μm or less.

3. The pressure sensor according to claim 1, wherein
the membrane is conductive, and
a base insulating layer having a thickness of 10 μm or less is formed between the membrane and the first gauge layer.

4. The pressure sensor according to claim 1, wherein the electrode layer has a thickness of 10 μm or less.

5. The pressure sensor according to claim 1, wherein a pattern arrangement of the first gauge layer and a pattern arrangement of the second gauge layer are substantially the same when viewed from a normal direction of the membrane.

6. The pressure sensor according to claim 1, wherein a pattern arrangement of the first gauge layer and a pattern arrangement of the second gauge layer are displaced in a rotational direction when viewed from a normal direction of the membrane.

7. The pressure sensor according to claim 1, further comprising a comparator circuit configured to compare and monitor a first detection signal detected by the first sensor and a second detection signal detected by the second sensor.

8. The pressure sensor according to claim 1, further comprising a switch configured to switch and output a first detection signal detected by the first sensor and a second detection signal detected by the second sensor.

9. The pressure sensor according to claim 1, wherein
another gauge layer is laminated on the second gauge layer via another intermediate insulating layer, and
a distance from a surface of the membrane to a sensor of another gauge layer is within 50 μm.

* * * * *